United States Patent [19]

Ueyoko et al.

[11] Patent Number: 5,547,005
[45] Date of Patent: Aug. 20, 1996

[54] RADIAL TIRE WITH ENHANCED BEAD DURABILITY

[75] Inventors: Kiyoshi Ueyoko, Osaka; Mikio Takatsu, Takarazuka, both of Japan

[73] Assignee: Sumitomo Rubber Industries, Ltd., Hyogoken, Japan

[21] Appl. No.: 971,470

[22] Filed: Nov. 4, 1992

[30] Foreign Application Priority Data

Nov. 5, 1991 [JP] Japan .................................... 3-318465

[51] Int. Cl.⁶ ................................. B60C 9/04; B60C 9/08; B60C 101/00; B60C 125/00
[52] U.S. Cl. ..................... 152/209 R; 152/454; 152/531; 152/539; 152/548; 152/556
[58] Field of Search ................................. 152/556, 558, 152/539, 548, 209 R, 454, 209 D, 531; 156/906

[56] References Cited

U.S. PATENT DOCUMENTS

| | | | |
|---|---|---|---|
| 3,298,417 | 1/1967 | Keafe, Jr. ................... | 152/556 |
| 4,044,810 | 8/1977 | Taniguchi et al. ................... | 152/454 X |
| 4,244,414 | 1/1981 | Uemura et al. ........................ | 152/556 |
| 4,262,721 | 4/1981 | Tadokoro et al. ................... | 152/454 X |
| 4,832,102 | 5/1989 | Domchick ................... | 152/556 |

FOREIGN PATENT DOCUMENTS

| | | |
|---|---|---|
| 323208 | 7/1989 | European Pat. Off. . |
| 0331453 | 9/1989 | European Pat. Off. ................ 152/454 |
| 356058 | 2/1990 | European Pat. Off. . |
| 0392748 | 10/1990 | European Pat. Off. ................ 152/556 |
| 0423997 | 4/1991 | European Pat. Off. ................ 152/454 |
| 435621 | 7/1991 | European Pat. Off. . |
| 0447200 | 9/1991 | European Pat. Off. ................ 152/548 |
| 2222232 | 10/1974 | France . |
| 2671516 | 7/1992 | France . |
| 2846964 | 5/1979 | Germany .............................. 152/556 |
| 2854611 | 7/1979 | Germany .............................. 152/556 |
| 3411770 | 1/1986 | Germany . |
| 0191102 | 11/1982 | Japan .................................... 152/556 |
| 644562 | 2/1989 | Japan .................................... 156/906 |
| 1-95911 | 4/1989 | Japan ................................ 152/209 D |
| 2179506 | 7/1990 | Japan ................................ 152/209 R |
| 2185807 | 7/1990 | Japan ................................ 152/209 D |
| 2241803 | 9/1990 | Japan ................................ 152/209 D |
| 3112702 | 5/1991 | Japan ................................ 152/209 R |
| 4-90905 | 3/1992 | Japan ................................ 152/209 R |
| 4176711 | 6/1992 | Japan ................................ 152/209 R |
| 1652106 | 5/1991 | U.S.S.R. .............................. 152/556 |

OTHER PUBLICATIONS

*Mechanics of Pneumatic Tires*, ed. Samuel Clark: U.S. Dept. of Transportation, Aug. 1981, pp. 130–131.
Clark, Samuel K. *Mechanics of Pneumatic Tires* Aug. 1981, p. 216.

*Primary Examiner*—Adrienne C. Johnstone

[57] ABSTRACT

A radial tire having a carcass extending from a tread through sidewalls to a bead core in each of two bead parts and turned up around the bead cores. The tire includes a belt layer disposed on the outside of the tire in the tire radial direction of the carcass in the tread portion and a cut breaker disposed between the carcass and the belt layer. Each carcass ply has cords that are buried in topping rubber and arranged independently in parallel to each other within the same plane without linking wefts. In a region from the bead bottom to the turned up end of the carcass, the distance between cords in adjacent carcass plies is within a range of ¼ to 2 times a diameter K1 of the carcass cord.

11 Claims, 12 Drawing Sheets

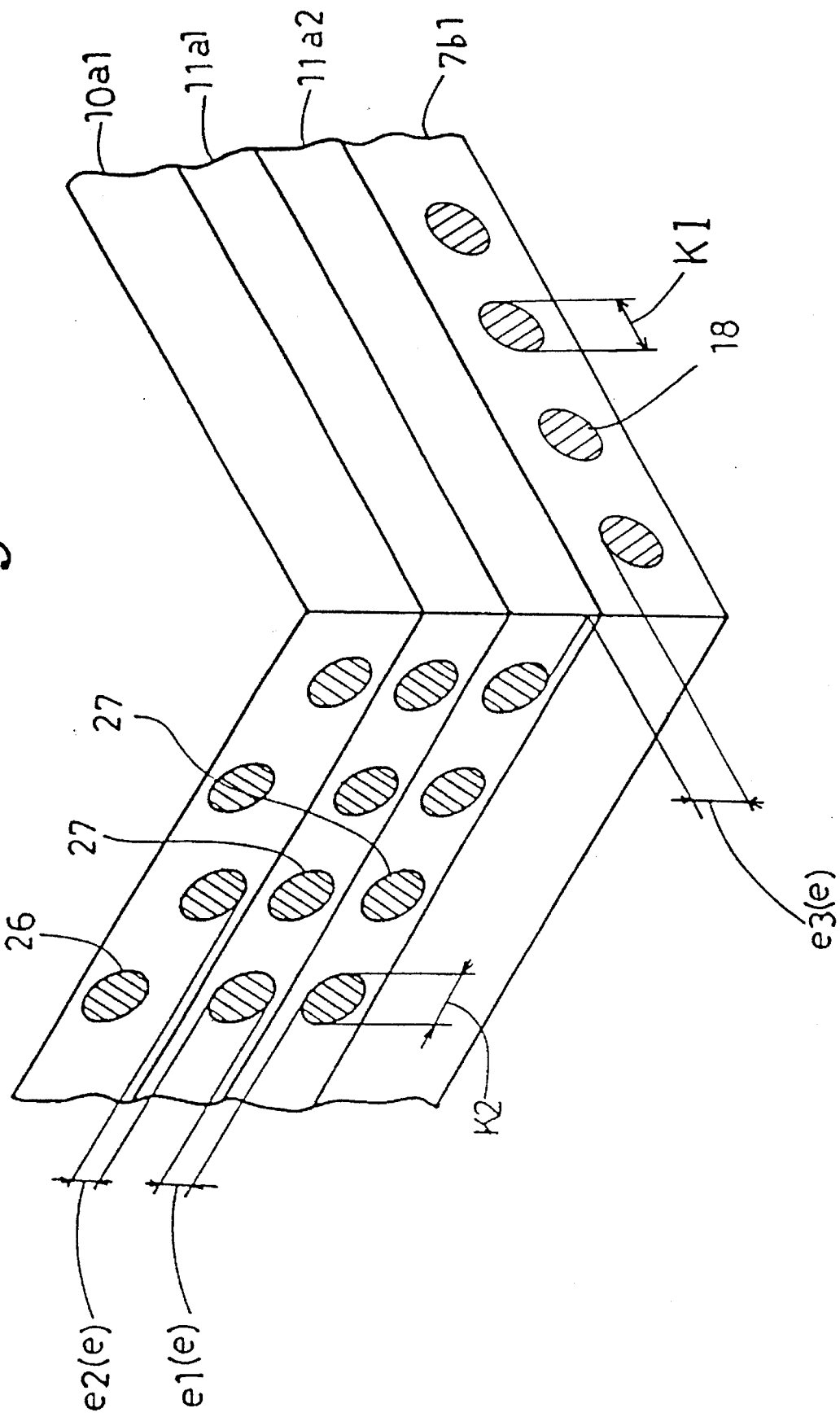

RADIAL TIRE WITH ENHANCED BEAD DURABILITY

The present invention relates to a radial tire capable of enhancing the structural durability, reducing the weight of the tire, and contributing to improvement of uniformity.

BACKGROUND OF THE INVENTION

Recently in tires used in heavy load and high speed conditions, such as aircraft tires, radial structures have emphasized structural durability, running performance, fuel cost performance and the like. Conventional for aircraft radial tires use a structure wherein a cut breaker is provided between the carcass and a belt layer, where the carcass is tightened using a hoop effect. Since such aircraft tires are used under the conditions of high internal pressure, heavy load and high speed, a higher durability is required as compared with the tires used in other fields.

In particular, the bead part and the cut breaker end part are likely to be largely distorted due to deformation by the large load when taking off or landing. As a result, bead damages and breaker end damages frequently occur.

Based upon accumulated studies of the cause and effect of damage to aircraft tires, one of the primary causes was found to be in the cord arrangement of carcass and cut breaker plies. The so-called tire fabrics having mutually arranged cords (A) woven together with fine wefts (B), as shown in FIG. 14, are usually used as both plies. In the weaving positions of the wefts (B), as shown in FIG. 15, the cords (A) are disposed in a zigzag format throughout the thickness of the plies. As the thickness of each ply is increased, the cords (A) are extremely close to each other locally between plies. Accordingly, in the event of tire deformation, the shearing force acting between cords is concentrated in the areas where the cords are in close contact. Thus, and this portion becomes weak and induces cord looseness.

Along with an increase in the thickness of carcass plies, the internal temperature in the bead part, which is largely bent and deformed, rises further lowering the bead's durability.

To reduce breaker end damage, one method calls for placing a protective rubber between plies at the end of the cut breaker to absorb and relax the shearing force. However, the protective rubber locally increases the tread thickness on the shoulder, as compared with the tread thickness on the tire equator. As a result, the temperature in the shoulder area is raised, and the durability of the breaker end is lowered.

To prevent such nonuniformity of the tread thickness, rubber located along the outside of the belt layer is reduced to correspond to the thickness of the protective rubber. However, reducing the rubber increases the rigidity on the tread surface along the shoulder causing uneven wear.

One of the present applicants previously proposed, in Japanese Laid-open Document No. 1-314744, to use an elastic cord with a relatively large expandability as the carcass cord, having an elongation $S_5$(%) at 5 kg loading of 5 to 10, or the divided value $D_5$(%/d) of the elongation $S_5$(%) divided by the denier number of cords in a range of $7.35 \times 10^{-4}$ to $14.7 \times 10^{-4}$, so as to provide the carcass cord with a large elongation when inflating with an internal pressure. This is effective to reduce the compressive stress generated in the carcass cord of the bead part in the event of bend deformation, so that compressive breakdown of the carcass cords may be prevented. However, by using such carcass cord with large expandability, the shearing force acting between the cords increases due to the large elongation, and when using such cords, in particular, it essential to suppress cord looseness.

SUMMARY OF THE INVENTION

One of the essential points of the invention to use plies of cords independently arranged in parallel to each other within the same plane without linking with weft, and when such plies are used in the carcass, the bead thickness may be reduced while maintaining a necessary cord interval notably enhancing durability. Or when used as cut breaker, similarly, the durability may be improved in the cut breaker end portion.

According to one aspect of the first invention, a radial tire including a carcass composed of a plurality of carcass plies of carcass cords laid at an angle of 75 to 90 degrees to the tire equator and extending from a tread through sidewalls to a bead core in each of two bead parts and turned up around the bead core, a belt layer composed of at least one belt ply of belt cords disposed outside in the tire radial direction of the carcass and in the tread part, and a cut breaker composed of at least one cut breaker ply of breaker cords disposed between the carcass and the belt. In the tire, at least the carcass ply has carcass cords arranged independently in parallel to each other within the same plane without linking with weft and buried in topping rubber. Also, at least at a region from a bead bottom to a turned up end of the carcass, a distance from the carcass cords in one carcass ply to the carcass cords in other carcass ply adjacent to said one carcass ply in the direction at right angle to the carcass is within a range of ¼ to 2 times a diameter K1 of the carcass cord.

In the second invention, at least a cut breaker ply has breaker cords arranged independently in parallel to each other within a same plane without linking with weft and buried in topping rubber. And at least at a 60% width region of the cut breaker from both ends of the cut breaker, a distance from the breaker cords in one breaker ply to the cords in other ply adjacent to said one breaker ply in the direction at right angle to the cut breaker is within a range of ¼ to 4 times a diameter K2 of the breaker cord.

Thus, since the plies are free from weft woven between cords, fluctuations of the carcass cords in the thicknesswise direction in plies may be prevented.

As a result, the thickness of one ply may be reduced, heat generation of rubber is decreased, and the tire weight is curtailed. In addition, the mutual cord intervals between plies are uniform and stable, local weak points such as cord looseness may be eliminated.

BRIEF DESCRIPTION OF THE DRAWINGS

An embodiment of the present invention will now be described by way of example, referring to the attached drawings, in which:

FIG. 4 is a perspective view for explaining the cord intervals of breaker plies;

DETAILED DESCRIPTION OF THE INVENTION

Figure 1:
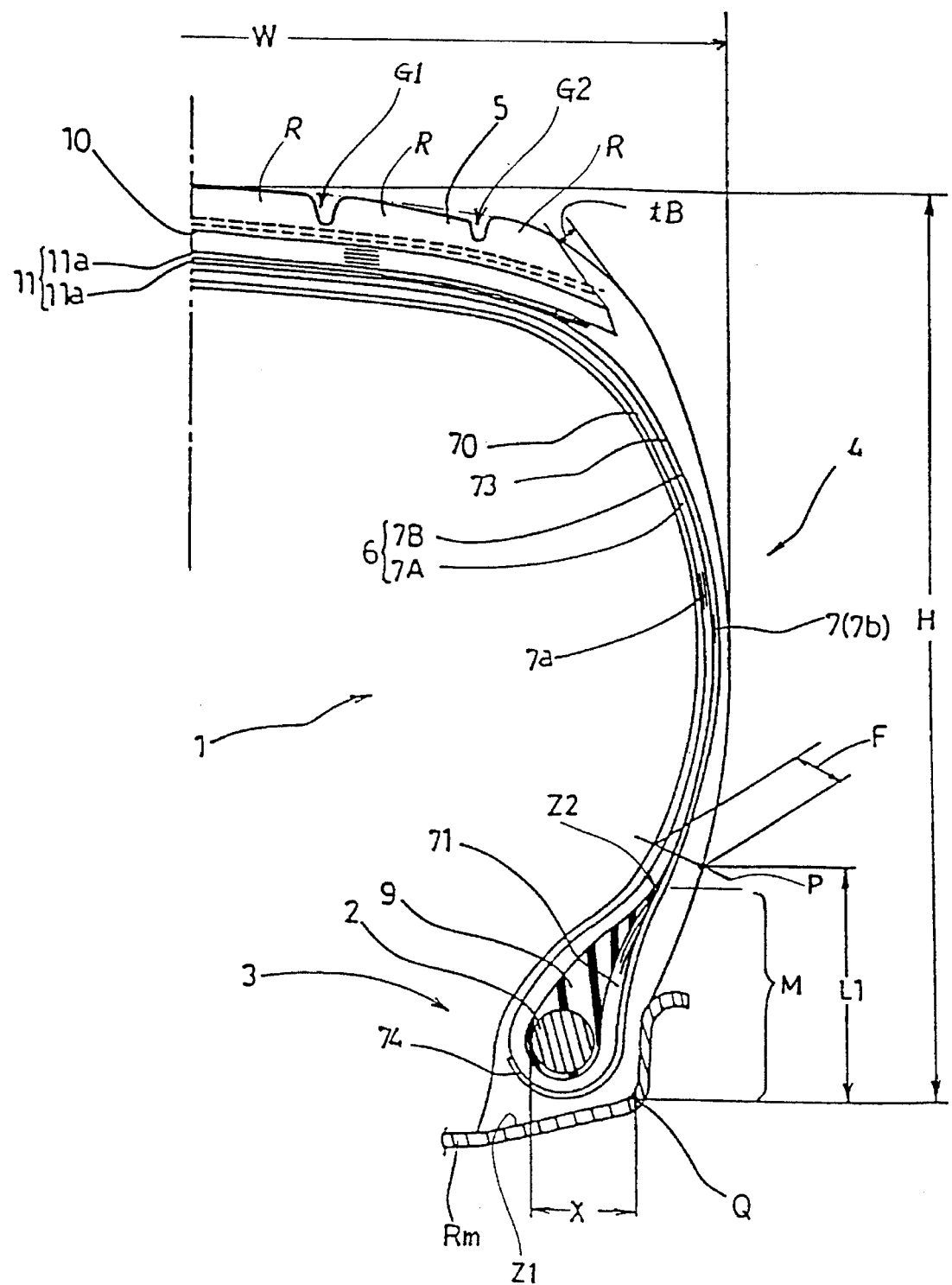
FIG. 1 is a sectional view showing an embodiment of the invention.

FIG. 1 shows a radial tire 1 for aircraft of size 46×17R20 under standard conditions mounted on a standard rim Rm and inflated with a standard internal pressure. In FIG. 1, a radial tire 1, includes two bead parts 3 with an annular bead core 2, two sidewalls 4 each extending from the bead part 3 outwardly in the tire radial direction, and a tread part 5 extending between the outer ends of the two sidewalls 4.

The tire 1, also, has a carcass 6 composed of a plurality of carcass plies 7, a belt layer 10 disposed outside in the tire radial direction of the carcass 6 and in the tread part 5, and cut breaker 11 disposed between the carcass 6 and the belt layer 10.

Figure 13:
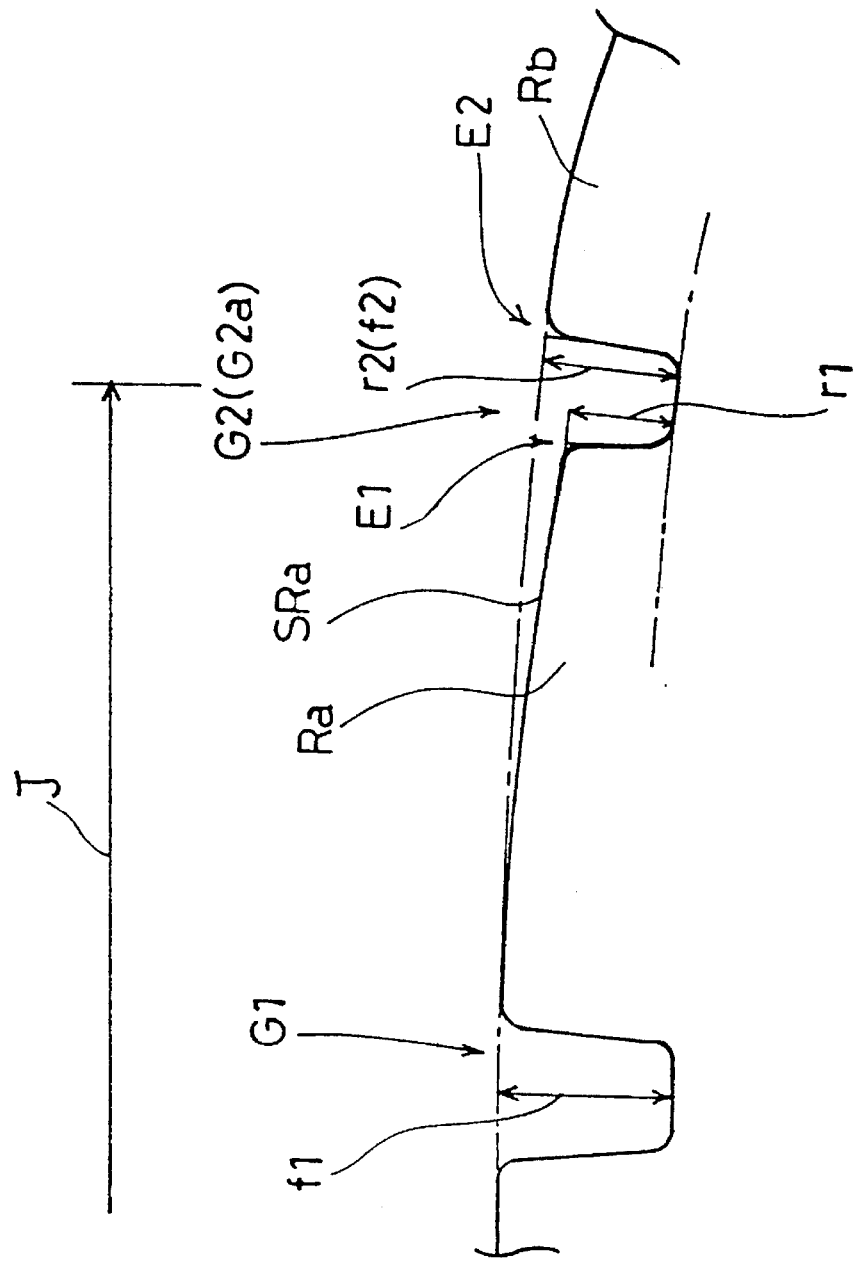
FIG. 13 is a sectional view for explaining main-groove and sub-groove.
Figure 14:
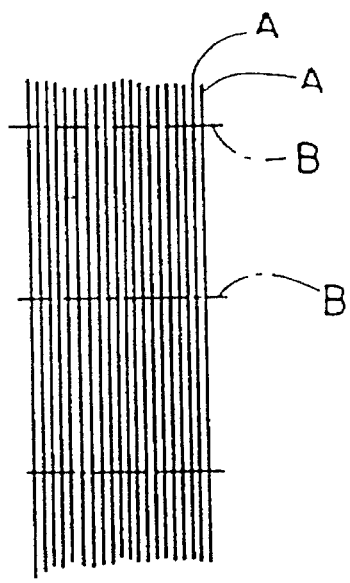
FIG. 14 and 15 are diagrams illustrating a cord arrangement in a conventional ply.
Figure 15:
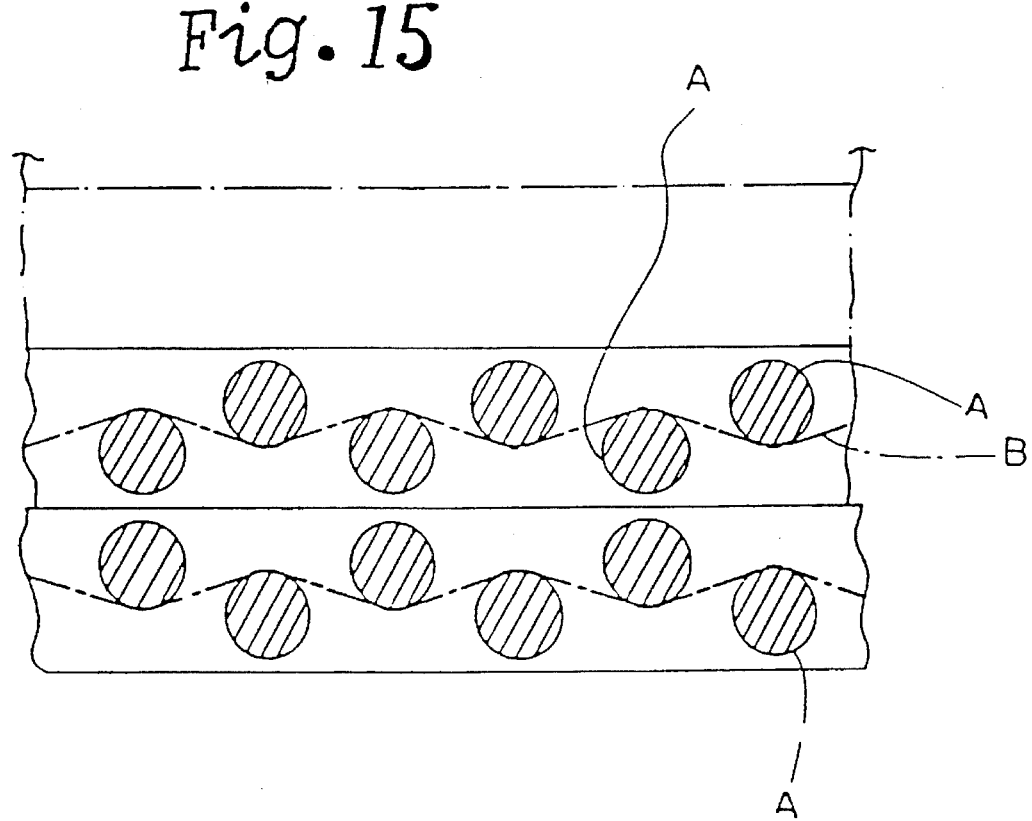

In this embodiment, a tread surface is divided into a plurality of ribs R by one or two circumferential main-grooves G1 extending in a tread center and at least one, circumferential sub-groove G2 disposed either outside in the tire axial direction of the main-grooves G1. As shown in FIG. 13, each of the sub-grooves G2 has a groove depth f2 within a range of 0.95 to 0.65 times the depth f1 of the main-groove G1. The sub-groove G2 or an outer most sub-groove G2a (if more than one sub-grooves is respectively provided outside of the main-grooves G1) is disposed in a region remote from the tire equator C by a distance J of 0.215 to 0.31 times the tire sectional width W. An outer surface SRa of an rib Ra adjacent inwardly in the tire axial direction to the outer most sub-groove G2a is inclined in the tire axial direction. And a rib thickness r1 at the outer end E1 of the rib Ra from the groove bottom of the sub-groove Ga2 is in a range of 0.75 to 0.95 times of a rib thickness r2 at the inner end E2 of a rib Rb adjacent outwardly in the tire axial direction to the sub-groove G2a.

The carcass 6, in this embodiment, includes an inner layer 7A composed of four inner carcass plies 7a turned up around the bead core 2 from inside to outside of the tire, and an outer layer 7B composed of two outer carcass plies 7b, which wind down around the bead core 2 from outside to inside of the tire so as to surround the turned-up portion 71 of the inner layer 7A.

The inner carcass plies 7a define the turned-up portion 71 at both ends of a main body 70 extending from the tread part 5 through sidewall parts 4 to the bead part 3. The outer carcass plies 7b define the winding-down part 74 at both ends of a main body 73.

The inner and outer carcass plies 7a, 7b respectively have carcass cords 18 inclined at an angle of 75 to 90 degrees to the tire equator. And in this embodiment, the carcass plies are overlaid by varying the cord's inclination so that the individual carcass cords 18 intersect as they alternate with between adjacent plies.

A bead apex 9 of tapered rubber extends from the bead core 2 in the tire radial direction for reinforcing the portion of the tire from the bead part 3 to the side wall part 4.

An elastic cord having a high expandability is used as the carcass cord 18. The elastic cord has an elongation value $S_{10}(\%)$ at 10% of the breaking load in a range of 5 to 10, an elongation value $S_{20}(\%)$ at 20% of the breaking load in a range of 9 to 15, and a elongation value $S_{40}(\%)$ at 40% of the breaking load in a range of 14 to 20.

In a carcass cord 18 of another preferred embodiment, a divided value $D_{10}(\%/d)$ of the elongation value $S_{10}(\%)$ divided by the denier number of the cord is in a range of $7.35 \times 10^{-4}$ to $14.7 \times 10^{-4}$, a divided value $D_{20}(\%/d)$ of the elongation value $S_{20}(\%)$ divided by the denier number of the cord is in a range of $13.2 \times 10^{-4}$ to $22.1 \times 10^{-4}$, and divided value $D_{40}(\%/d)$ of the elongation value $S_{40}(\%)$ divided by the denier number of the cord is in a range of $20.5 \times 10^{-4}$ to $29.4 \times 10^{-4}$.

Figure 6:
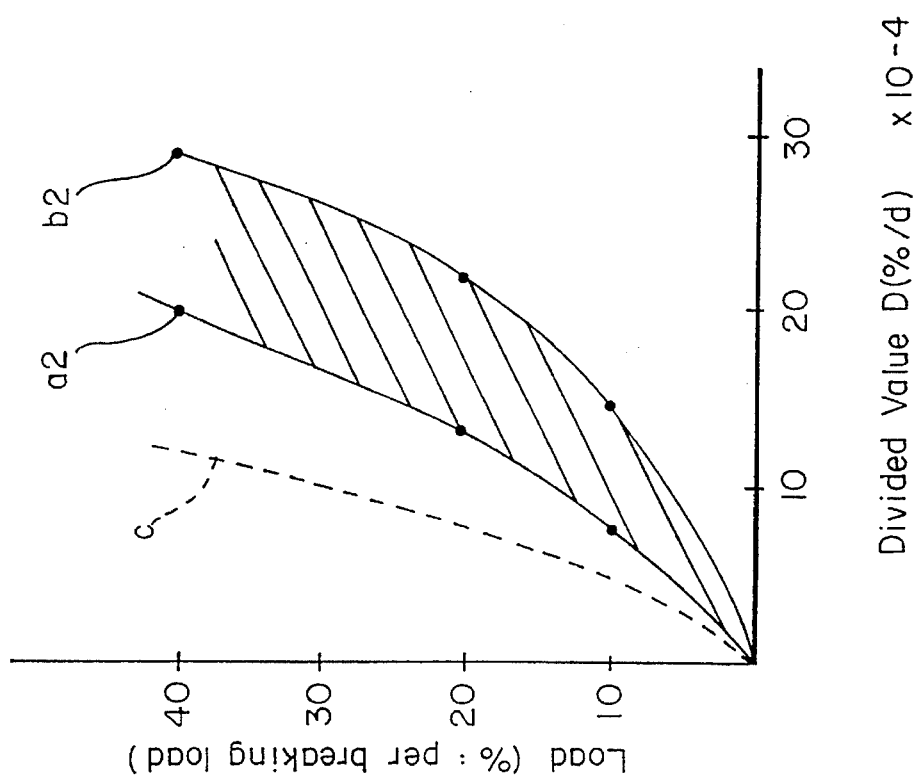
FIGS. 5 and 6 are diagrams showing characteristics of carcass cords.
Figure 5:
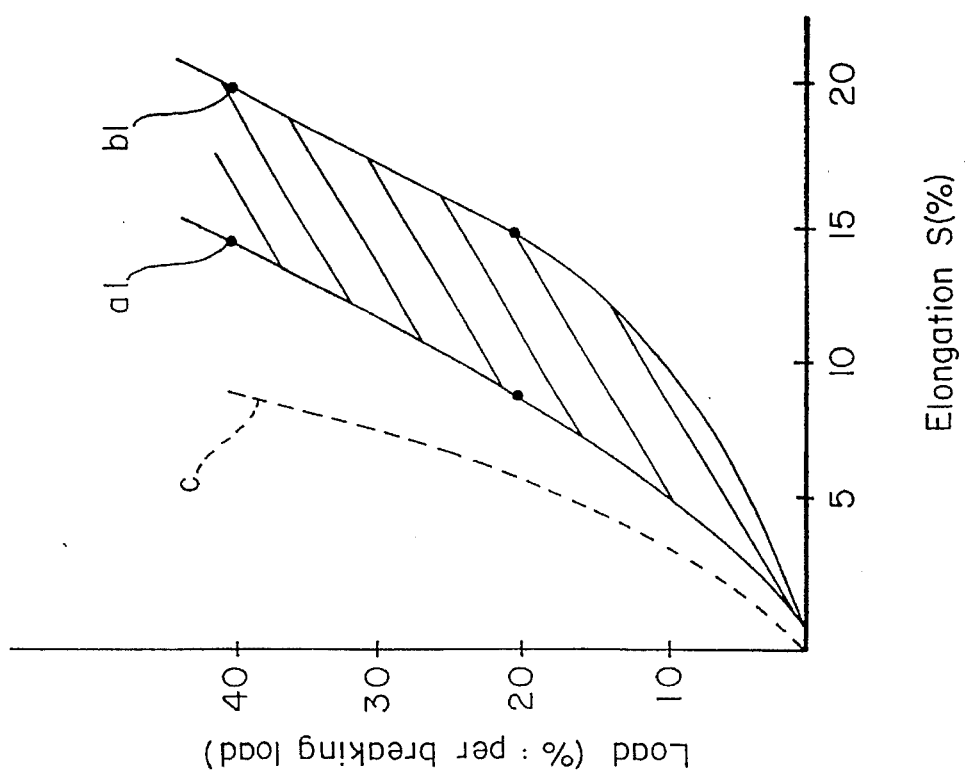

Characteristics of the elastic cords are shown in FIGS. 5 and 6. The cords having characteristics put between the lowest curves (a1) and (a2) and the highest curves (b1) and (b2). As shown in FIG. 6(A), the elastic cord has greater elasticity with small loads, as shown by curves (a) and (b). Curve a is a combination of curves (a1) and (a2), and curve b is a combination of curves (b1) and (b2) As reflected by the curves, the rate of elongation change decreases as the load increases.

By using elastic cords with these properties, the carcass cords have a larger elongation during the initial stage of inflation.

When the load increases to 20% and 40% of the breaking load, the carcass cord stretches further as the load increases, while the rate of elongation decreases accordingly.

Curve (c), representing conventional cords forms a steeper curve as compared to curve (a). Further, curve (c) is approximately linear. Therefore, when conventional cords are used, the the carcass cords elongate more even during inflation and are inferior in reducing compressive stress acting in deformation. Especially, compressive breakdown of the carcass cords occurs at the bead part.

In comparison, since the elastic cord has characteristics occurring between curve (a) and curve (b), it can improve the durability of the tire. For this improvement, preferably, the elongation value $S_{10}(\%)$ is set within the range 5 to 8 and the elongation value $S_{20}(\%)$ is set within the range 10 to 12.

The elongation values $S_{10}(\%)$, $S_{20}(\%)$ and $S_{40}(\%)$ specify amount of elongation of the cord upon loading, regardless of the denier number of the cord. With reference to FIG. 6, the divided values involve the denier number, thus specifying the elongation per denier. Therefore, the divided value means the elongation ratio per denier and reflects the carcass cord mainly from the characteristics of the cord.

In addition, the initial modulus of elasticity Es (kg/sq.mm) of the elastic cord should be 130 (preferably 140 or more) to 200.

Figure 7:
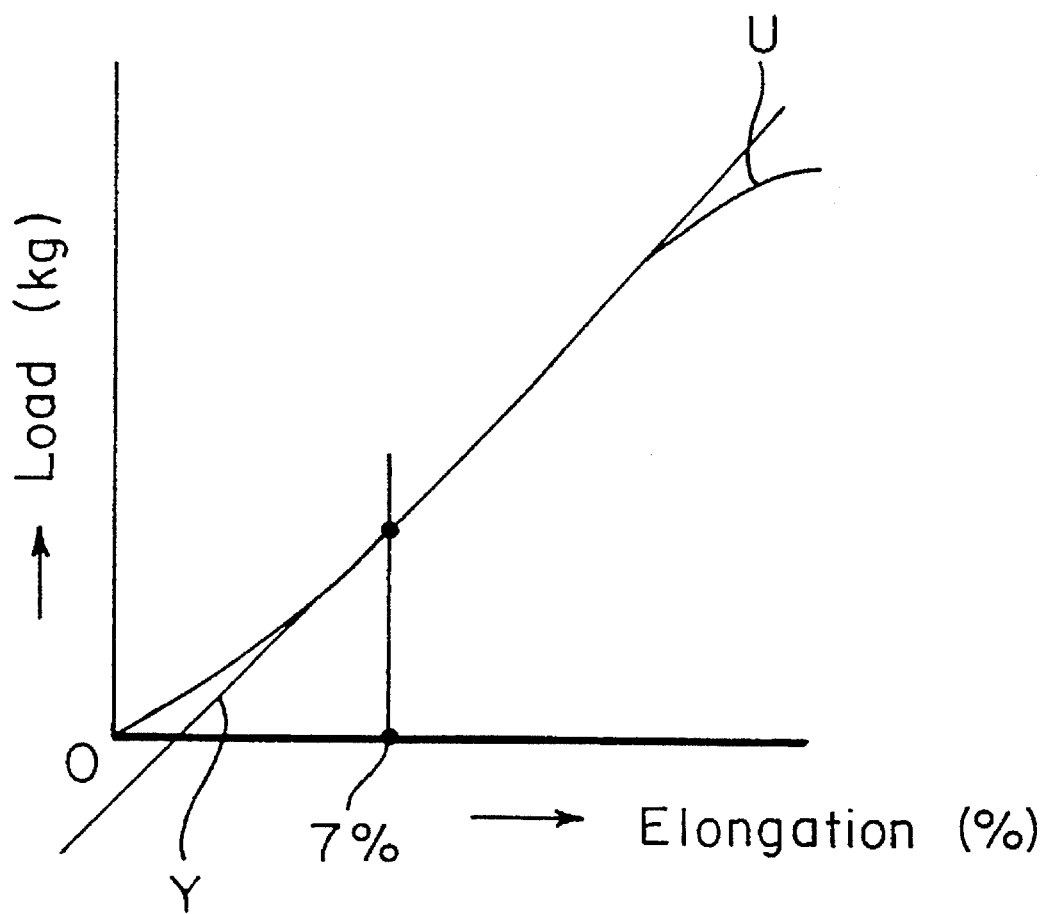
FIG. 7 is a diagram for explaining an initial elasticity.

The initial modulus of elasticity Es (kg/sq.mm) means the elastic modulus at 7% elongation, that is, as shown in FIG. 7, the slope (%/kgf) of the tangent Y to the Load Elongation curve U at 7% elongation. By setting the initial modulus of elasticity Es (kg/sq.mm) at a smaller value within the range compared to a conventional cord, the stretchability of the elastic cord is improved and elongation is added to the carcass cord. The load at breakage of the elastic cord is preferably not less than 20 kg, and more preferably in the range of between 40 to 60 kg.

The elastic cord may include, either separately or in combination, nylon cord, polyester cord, aromatic polyamide cord, carbon cord and metallic cord.

Figure 3:
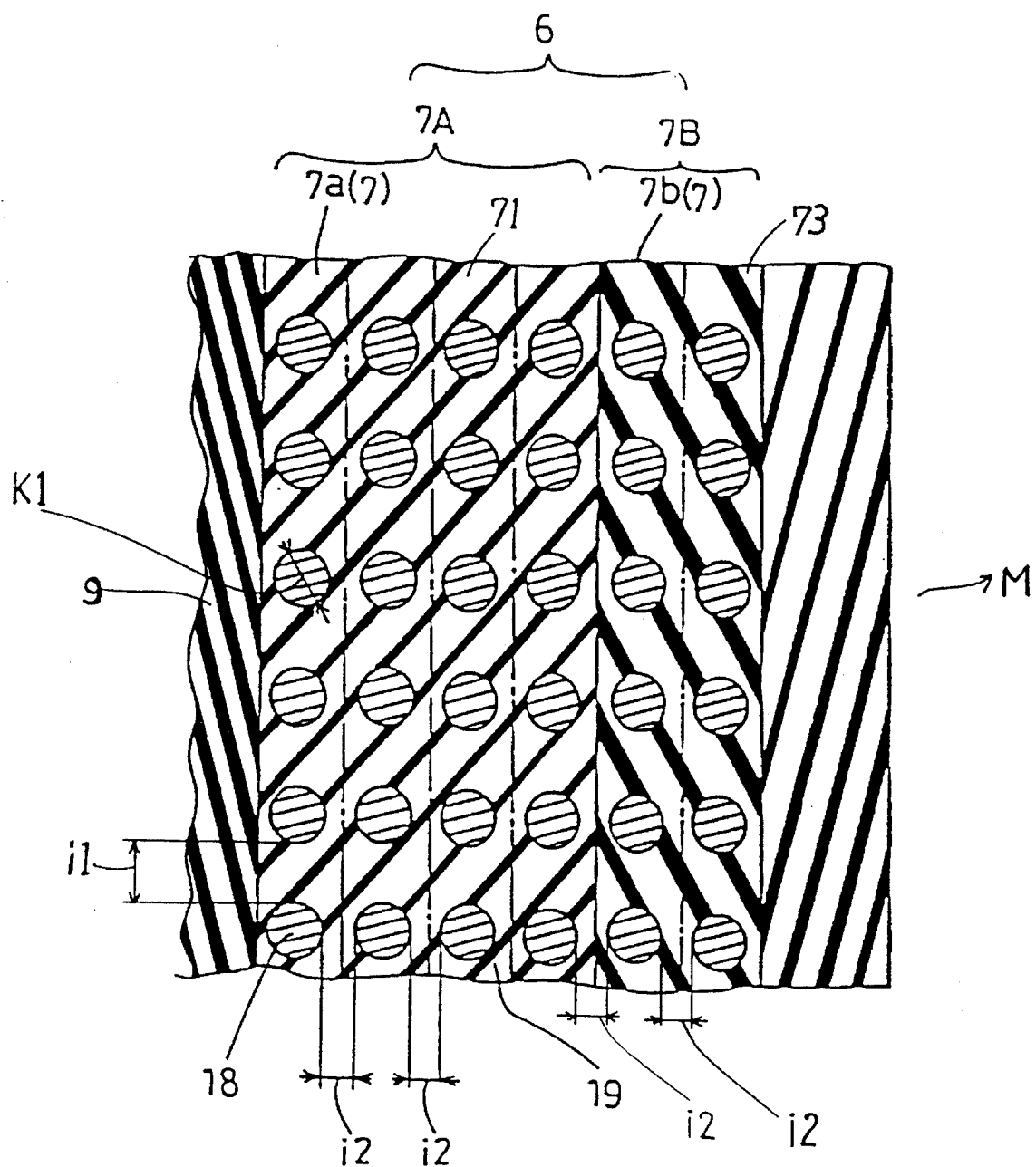
FIG. 3 is a sectional view for explaining the cord intervals of carcass plies.

In the first preferred embodiment of the invention, a new structure of the carcass 6 is employed in order to suppress cord looseness at the bead part 3 that is particularly induced by the use of carcass cords 18 of high stretchability. The carcass ply 7 includes carcass cords 18 being flatly disposed without variance throughout the thickness of the ply. As while, as shown in FIG. 3, the cord intervals i2 between the carcass plies 7 are defined to be ¼ to 2 times the diameter K1 of the carcass cords 18 in at least the region M from a beam bottom Z1 to a turned up end Z2 of the carcass 7.

That is, the carcass ply 7 is in a sheet form having a cord arrayal 20 wherein the carcass cords 18 are independently arranged in parallel to each other within the same level plane without linking with a weft, and the cord arrayal 20 is buried in a topping rubber 19. The cord interval i2 is defined as a distance from the carcass cord 18 in one carcass ply 7 to the carcass cord 18 in other carcass ply 7 adjacent to said one carcass ply in a perpendicular direction to carcass 6.

Therefore, as compared with the conventional plies made of so-called tire fabrics, the ply thickness may be notably reduced while maintaining the covering thickness of topping rubber 19. As a result, the weight of the tire is reduced and heat generation decreased. It is possible to prevent local contact of carcass cords 18 between the plies 7, 7 adjacent to each other, and therefore the starting point of cord looseness is eliminated. Similarly, lateral roll-off and longitudinal roll-off of tire may be reduced by the improvement of uniformity, so that the running performance may be improved.

In order to effectively prevent thermal breakdown due to heat generation, with reference to FIG. 1, it has been desired to set the ratio F/X at 0.6 or less. It is possible to set the ratio F/X much smaller by the use of the carcass plies described in the above structure. The value F is the bead thickness at reference point P on the tire outer surface remote from a bead heel point Q by a distance L1 of 0.2 times the tire sectional height H. The mark X is the length in the tire axial direction from the bead heel point Q to the inner edge in the tire axial direction of the bead core 2.

Figure 2:
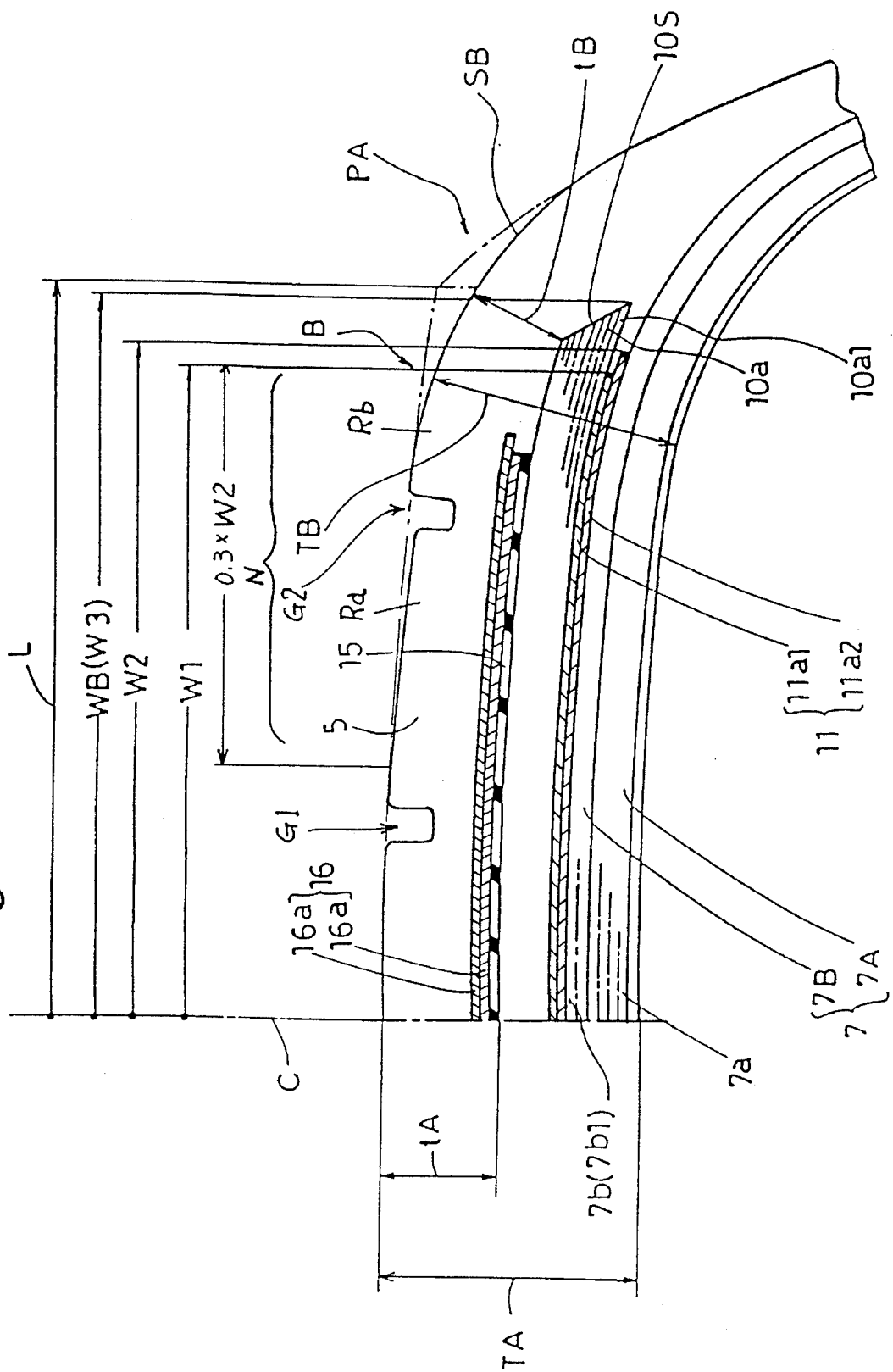
FIG. 2 is a sectional view showing a magnified tread part.

As shown in FIG. 2, the cut breaker 11 is formed of two plies 11a1, 11a2 of breaker cords 27 inclined at an angle of 0 to 70 degrees. The plies 11a1, 11a2 are disposed by varying the direction of cord inclination so that the breaker cords 27 mutually cross between the plies, the width W1 of the outer ply 11a1 is defined to be smaller than the width W2 of the inner ply 11a2 adjacent inside, and also smaller than the width W3 of the ply 10a1 of the belt layer 10 adjacent outside. Thus by varying the ply end positions, the stress is distributed. The width W2 that is the maximum width of the cut breaker is set in a range of 70 to 85% of the tire sectional width W, or preferably 73 to 78%. Meanwhile, the width W1 may be defined to be equal to or greater than the width W2, W3.

The cut breaker 11 is intended to heighten the bending rigidity on the tread surface and increase the cornering force. Hence it is disposed to form a triangular structure together with the carcass cord 18 and belt cord 26. That is, inclinations of carcass cord 18, belt cord 26 and breaker cord are different from each other. The carcass cord 18 is inclined at an angle of 75 to 90 degrees to the tire equator, and the belt cord 28 is disposed at an angle of 0 to 5 degrees. The breaker cord 27 is set at an angle of 10 to 45 degrees, or more preferably 10 to 30 degrees, forming a rigid triangular structure with the belt cord 28 and carcass cord 18. When the angle of the carcass cord 18 is 75 to 80 degrees, the inclination of the breaker cord 27 may be set close to 0 degree.

Thus, by the addition of the cut breaker 11, and by the triangular structure with carcass cord 18 and belt cord 26, the bending rigidity on the tread surface is heightened, the cornering force is increased, and generation of standing wave is suppressed.

In the second preferred embodiment of the invention, the plies 11a1, 11a2 are formed in a structure nearly the same as that of the carcass plies in order to control the ply separation propagating from each end of the plies 11a1, 11a2 attributable to formation of the cut breaker 11.

More specifically, each one of the plies 11a1, 11a2 is in a sheet form, having a cord arrayal 20 with breaker cords 27 parallel to each other within a same level plane without linking with a weft, buried in the topping rubber 19.

Therefore, the carcass plies 7, as compared with the conventional plies, and the ply thickness are notably reduced while maintaining the covering thickness of the topping rubber. At the same time, the weight may be reduced while decreasing the heat generation. In addition, since local contact of cords between adjacent plies may be prevented, the cord interval e may be set within a minimum required limit so as to absorb and relax the shearing stress acting between the plies.

In this case, the cord interval e denotes a distance from the breaker cord 27 in one breaker ply 11a to the cord 27, 18 or 26 in an adjacent ply 11a, 7b of 10a in a direction perpendicular to the cut breaker. As shown in FIG. 4, the cord interval e includes a distance e1 between a breaker cord 27 of the outer ply 11a1 and a breaker cord 27 of the inner ply 11a2, a distance e2 between a breaker cord 27 of an outer ply 11a1 and a belt cord 26 of the innermost ply 10a1 of the belt layer 10, and a distance e3 between a breaker cord 27 of an inner ply 11a2 and the carcass cord 18 of the outermost ply 7b1 of the carcass 7. In this invention, the distances e1, e2, e3 are defined in a range between of ¼ to 4 times the the diameter K2 of the breaker cord 27 at least at a 60% width region N of the cut breaker 11 from both ends of the cut breaker 11; thereby the shearing force is relaxed by the rubber elasticity of the topping rubber 19 intervening between the cords.

As shown in FIG. 2, the belt layer 10 is composed of, for example, eight belt plies 10a on the cut breaker 11, and a side surface 10S slopes along the tire outer surface SB wherein a shortest distance tB from the side surface 10S to the outer surface SB is defined around 3 of the 15 mm. The belt layer 10 also has a belt width WB of about 70 to 85% of the tire sectional width W, and heightens the tire rigidity together with the cut breaker 11 to enhance the running performance.

The belt ply 10a is formed of a tire fabric including the belt cords 26 arranged at an inclination of 0 to 5 degrees to the tire equator. In the case of a first embodiment of the invention, the belt cords 26 may be arranged at an inclination of 0 to 20 degrees to the tire equator, but preferably, 0 to 5 degrees.

By eliminating the restraint force from the weft, it is possible to arrange the carcass plies 7 and breaker plies 11a with high precision on the same level plane. However, the cord arrangement may be largely disturbed in the forming process.

Figure 8:
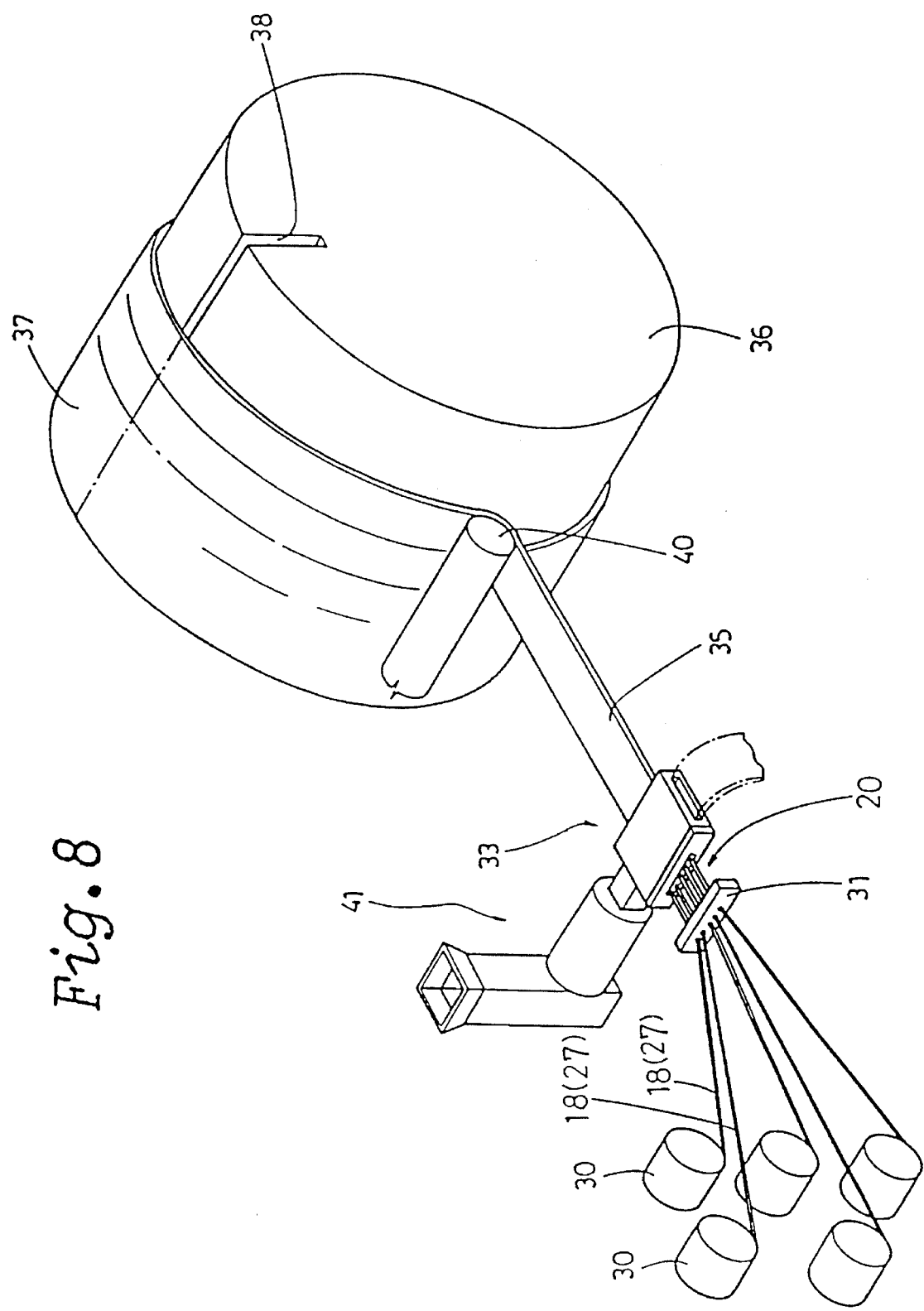
FIGS. 8 and 9 are diagrams for explaining means for forming plies.
Figure 9:
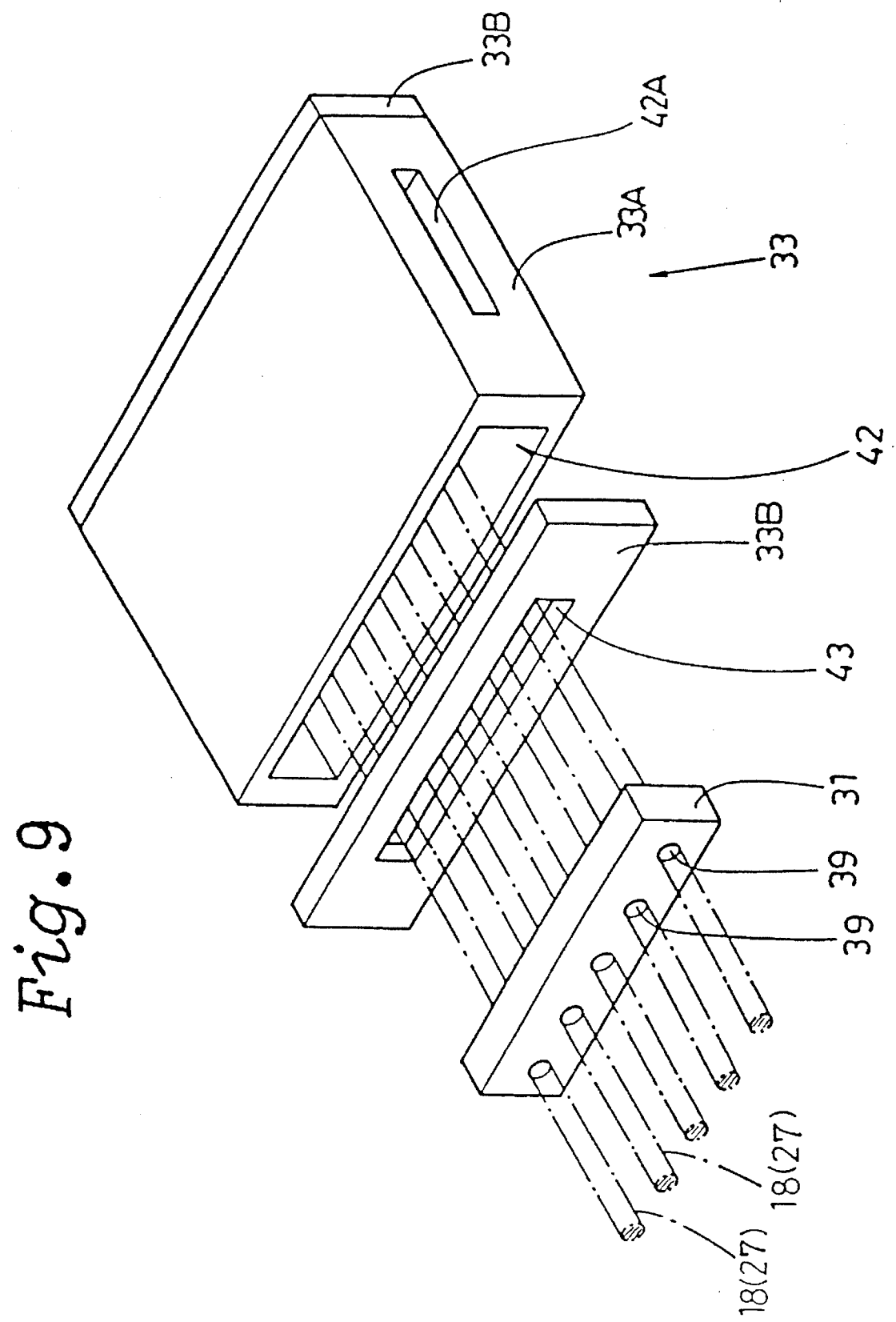

The forming process is realized by the use of a new process proposed by the present inventor. That is, as shown in FIGS. 8 and 9, the cord arrayal 20 is composed of cords 18 or 27 unwound from the bobbins 30 and arranged in parallel to each other by a guide 31 and coated with a specified thickness of topping rubber 19 in a die 33, thereby forming a tape body 35 with uniform thickness and width. Afterwards, the tape body 35 is spirally wound on a drum 36 having an outside diameter corresponding to the tire size, thereby forming cylindrical body 37. It is then cut along the slit 38 on the drum extending in across its width, thereby forming a carcass ply of a broad and homogeneous sheet.

The guide 31 is in a block form, for example, having guide holes 39 for passing the cords at equal pitches on one line, as shown in FIG. 9. The cords are arranged in parallel to each other within the same plane on the downstream side, by making use of the tension acting between the bobbin 30 and the holder roller 40. The die 33 includes a base body 33A having a rubber compartment 42 communicating with a rubber extruder 41, and an end body 33B detachably mounted to the front and rear ends of the rubber compartment 42 and having a hole 43. The end body 33B is mounted such that the hole 43 is disposed coaxially with the cord arrayal 20. Therefore, the tape body 35 has a section corresponding to the shape of the hole 43 with the cord arrayal body 20 buried within. The base body 33A has a discharge port 42A for discharging excess rubber.

Figure 10:
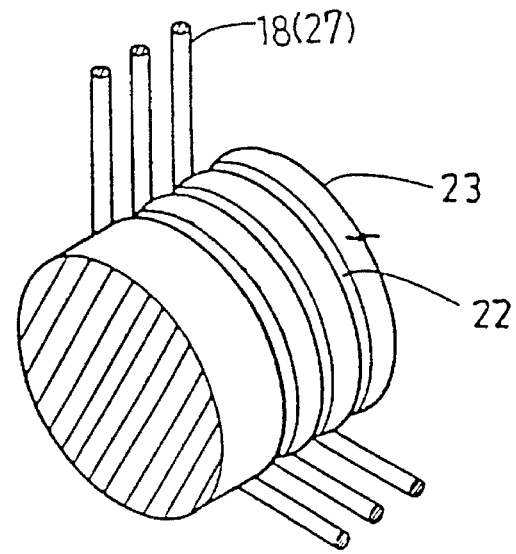
FIGS. 10 and 11 are diagrams for showing other means for forming plies.
Figure 11:
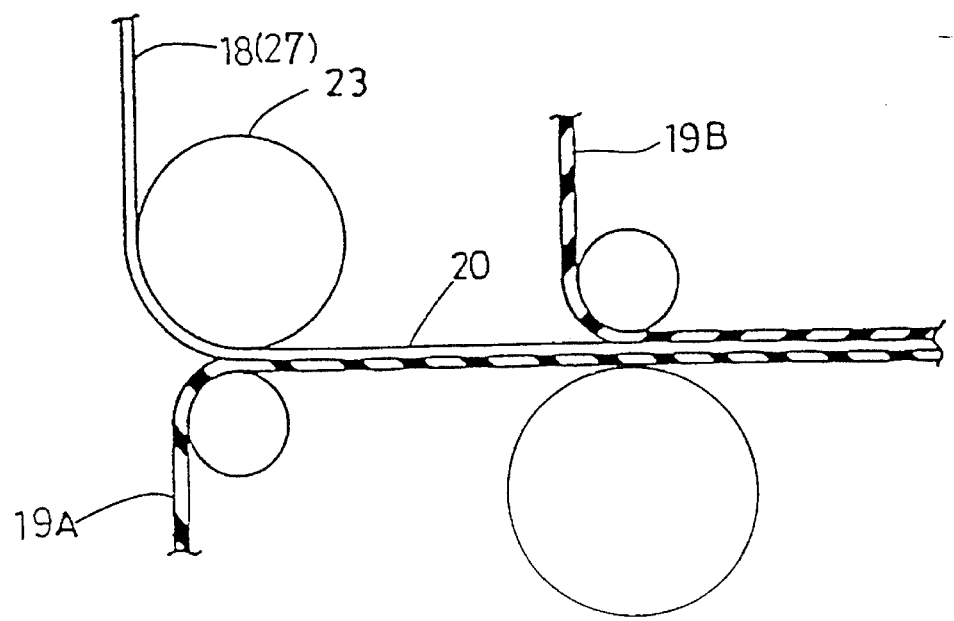

An alternative method for forming the plies is shown in FIGS. 10 and 11. That is, by using a drum 23 having parallel grooves 22 for positioning and receiving cords 18 or 27, a plurality of cords are held parallel with respect to each other on the outer circumference of the drum 23. While applying the topping rubber piece 19A on the outer surface of the drum 23 in a uniform thickness, a similar topping rubber piece 19B is applied on the other side of the cord arrayal 20.

Hence, the cords 18, 27 are arranged parallel to each other within the same level plane in the rubber structure 19, without thickness deviation.

Figure 12:
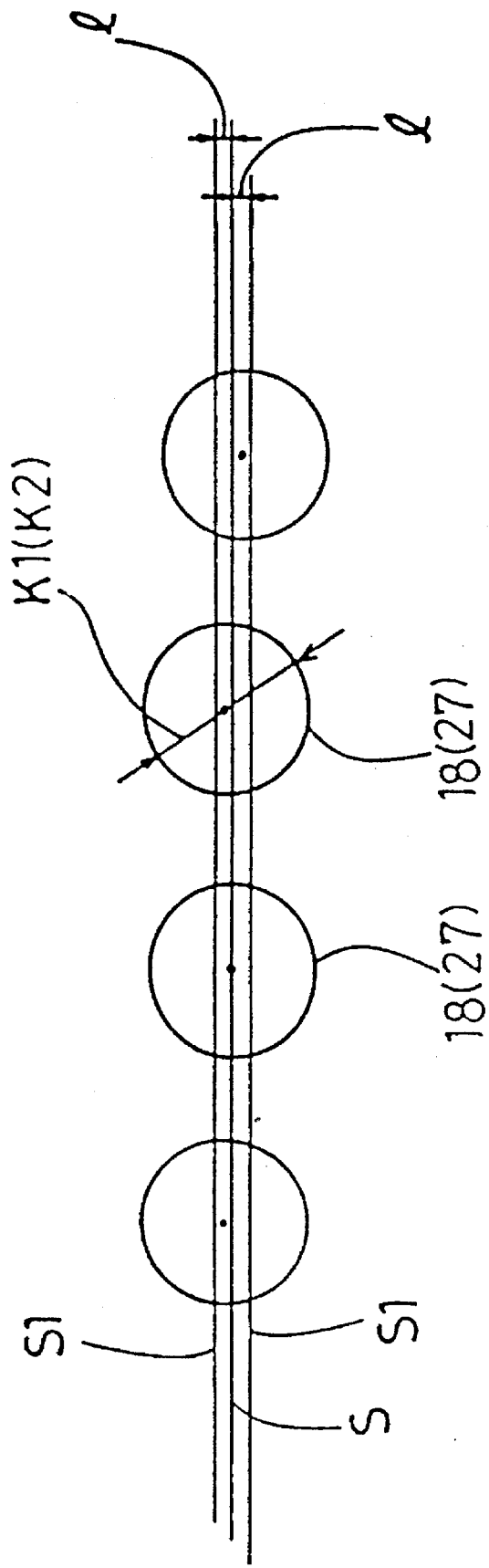
FIG. 12 is a sectional view for explaining plies.

To be "arranged within a same level plane" means that the cords 18 or 27 are arranged parallel with respect to each other having their centers positioned between the upper and lower critical planes S1, as shown in FIG. 12. Each critical plane S1 is separated from the reference plane S by a distance l of 1/10 times the diameter K1 or K2 of cords. The distance l is preferably 1/12 times or less the diameter K1 or K2, or more preferably 1/14 times or less.

The diameters K1, K2 refer to the minimum of the diameters of the circle circumscribing the cords.

To improve bead durability, the cord intervals i2 in at least a region M from the bead bottom Z1 to a turned up end Z2 of the carcass 6. If the cord intervals i2 are less than ¼ times the diameter K1, the relaxing effect of the shearing stress is insufficient, which may result in cord looseness. If i2 exceeds 2 times the diameter K1, the thickness of the tire increases excessively, adding tire weight which increased the internal temperature inducing thermal breakdown of the rubber. In the cut breakers 11, likewise, it is desired to define the cord intervals e in at least 60% of the width region N of the cut breaker 11 from both ends of the cut breaker 11. If the cord interval e is less than ¼ times the diameter K2, the relaxing effect of shearing force may cause cord looseness and if in excess of 4 times, heat generation increases.

The cord interval i2 defines the positional relationship between adjacent carcass plies 7 including, the cord interval between main bodies 70 of the inner layer 7A, the cord interval between the turned-up parts 71 of the inner layer 7A, the cord interval between the main body 70 of the inner layer 7A and its turned-up part 71, the cord interval between the main bodies 73 of the outer layer 7B, and the cord interval between the turned-up part 71 and the main body 73.

Definition of the cord intervals i2 is realized by using the novel carcass without a weft, with carcass plies made from carcass cords having high expandability (such as steel) and other carcass cords of low expandability.

A cut protector 16 disposed outside of the belt layer 10 is composed of at least one, or two in this embodiment, plies 16a of protective cords. The cut protector 16 improves cut resistance, relaxation of the difference in rigidity between the belt layer 10 and rubber of tread 5, and reduction of the shearing stress between them.

It is accordingly desired to dispose the cut protector 16 over the entire surface of the belt layer 10. In order to allow for the desired deformation of the belt layer 10, the cord angle to the tire equator should be to 0 degree, and the protective cord may be provided with expandability.

Furthermore, the cut protector 16 may be composed of two or more layers, instead of one ply. And as shown in FIG. 2, a rubber layer 15 may be disposed between the cut protector 16 and the belt layer 10. This rubber layer 15 helps to remove the cut protector 16 easily, without damaging the belt layer 10, when regenerating the tire.

In the invention as shown in FIG. 2, the ratio TB/TA of the total tread thickness T is defined to be 1 or less in the standard state. TA is the total tread thickness at the tire equator C. TB is the total tread thickness at 90% landing point B which is remote from the tire equator by 90% of the length L from the tire equator C up to landing point end PA. By the use of the cut breaker 11, the thickness ratio TB/TA may be kept at 1 or less without decreasing the tread rubber thickness tB at the landing end PA measured from the belt layer 10 to the tread surface as compared with the tread rubber thickness tA on the tire equator C. Consequently, the bending stiffness of the shoulder part decreases relatively, so that a tire profile with a small bead deformation may be obtained.

EXAMPLES

Trial products of aircraft tires having the tire structure as shown in FIG. 1 with a tire size of 46×17R20 were manufactured according to the specifications of Table 1. The high speed durability and low speed durability were measured in the bead parts of the trial tires.

As high speed durability test, a take-off test conforming to the U.S. Civil Aviation Bureau's Standard TSO-C62c was conducted 100 times at 150% standard load, and the presence or absence of carcass rubber breakdown was evaluated. The heating index of the bead part was calculated by dividing the temperature difference of the mean bead temperature after running 100 times and the bead temperature before running, by the bead temperature before running.

Besides, as the low speed durability test, at 120% reference load, by running continuously at a speed of 11 km/h, the running distance until the bead was broken was evaluated.

Similarly, the tires in the structure as shown in FIG. 1 in the size of 46×17R20 were manufactured according to the specification in Table 2, and the durability was compared with the above trial tires.

As the durability test, likewise, at 120% loaded state, the damages were compared by running continuously for 3000 km at traveling speed of 11 km/h. The cornering force was measured by using a flat belt type indoor testing machine, and the results are expressed in the index with the value by excluding the cut breaker taken as 100. The greater the numeral, the greater the performance.

TABLE 1

|  | embodement 1 | Comparison 1 | Comparison 2 | Comparison 3 | Comparison 4 |
| --- | --- | --- | --- | --- | --- |
| Carcass cord diameter (mm) | 1.02 | 1.02 | 1.02 | 1.02 | 1.02 |
| Interval i1 (mm) | 1.2 | ✕·1.2 | ✕·1.2 | ✕·1.2 | ✕·1.2 |
| Interval i2 (mm) | 1.0 | ✕·1.0 | ✕·2.0 | ✕·0.2 | ✕·2.5 |
| Presence/absence of weft | Absent | Present | Present | Present | Present |
| High speed durability |  |  |  |  |  |
| • Bead heating index | 0.95 | 1.15 | 1.37 | 0.98 | 1.50 |
| • Carcass rubber break | No | No | No | No | Initial break occurrence |
| Low speed durability |  |  |  |  |  |
| • Traveling distance | 3000 km (complete run) | 3000 km (complete run) | 3000 km (complete run) | 3000 km (complete run) | 3000 km (complete run) |
| • Mode of damage | No | No | No | Turned-up end initial loose | No |
| • Carcass rubber break | No | No | No | Initial break occurrence | No |
| Tire weight index | 100 | 104 | 107 | 102 | 110 |

✕· Minimum value of cord interval

TABLE 2

|  | Embodiment 2 | Embodiment 3 | Embodiment 4 | Comparison 5 | Comparison 6 | Comparison 7 |
| --- | --- | --- | --- | --- | --- | --- |
| Carcass |  |  |  |  |  |  |
| No. of plies (inner) | 4 | 4 | 4 | 4 | 4 | 4 |
| (outer) | 2 | 2 | 2 | 2 | 2 | 2 |
| Cord angle | 85° | 85° | 85° | 85° | 85° | 85° |
| Belt layer |  |  |  |  |  |  |
| No. of plies | 8 | 8 | 8 | 8 | 8 | 8 |
| Cord angle | 0° | 0° | 0° | 0° | 0° | 0° |
| Cut breaker |  |  |  |  |  |  |
| No. of plies | 2 | 2 | 2 | 2 | 2 | 2 |
| Cord angle | 19° | 19° | 19° | 19° | 19° | 19° |
| Presence/absence of weft | Present | Present | Present | Present | Present | Present |
| Cord interval c | ¼K | ½K | 4K | 0 | ✕·⅛K | ✕·5K |
| 100% modulus | 50 | 50 | 50 | 50 | 50 | 50 |
| Cut protector | Peovided | Peovided | Peovided | Peovided | Peovided | Peovided |
| Cornering force | 130 | 130 | 130 | 130 | 130 | 130 |
| Durability. running distance | 3000 km (complete run) | 3000 km (complete run) | 3000 km (complete run) | 450 km (interrupted) | 1240 km (interrupted) | 850 km (interrupted) |
| Performance | Excellent | Excellent | Cord losse, not weather resistant | Cord losse | Cord losse | Ply separation |

✕·Minimum cord interval

What is claimed is:

1. A radial tire comprising:

a tread having a main groove of a depth f1 circumferentially extending substantially parallel to the tire equator and a sub-groove disposed between the main groove and the outside edge of the tread of a depth f2 where f2 is in the range of between 0.65 to 0.95 f1;

a carcass composed of a plurality of carcass plies, each of said carcass plies having a plurality of carcass cords laid at an angle of 75 to 90 degrees to the tire equator and extending from the tread through sidewalls to a bead core in each of two bead parts and turned up around each bead core, wherein a ratio F/X is equal to or less than 0.6, such that a bead thickness F is the distance between a point P located on the tire's outer surface a distance L1 of 0.2 times a tire sectional height H to a bead heel point Q, and a length X is the distance in the tire axial direction between the bead heel point Q and the inner edge of a bead core;

a belt layer composed of at least one belt ply of belt cords disposed outside of the carcass in the tire radial direction in the tread; and a cut breaker composed of at least one cut breaker ply of breaker cords disposed between the carcass and the belt layer, each of said carcass plies having carcass cords buried in topping rubber, the center of each carcass cord being arranged without linking with weft between an upper critical plane and a lower critical plane, each of said upper and lower critical planes being equally spaced from a reference plane a distance of $+\!\!^1\!/_{10}$ times the diameter of the carcass cords, and in the regions of the tire extending from the bottom of each of said beads to the turned up ends of said carcass, each of said plurality of cords in adjacent carcass plies being spaced a distance within a range of between ¼ to 2 times a diameter K1 of one of the plurality of carcass cords, wherein the distance being the shortest distance between the outer surfaces of each of the carcass cords in a perpendicular direction to the carcass.

2. A radial tire of claim 1, wherein the carcass cords have a value of a stretch $S_{10}(\%)$ at 10% load of breaking load being in a range of 5 to 10.

3. A radial tire of claim 1, wherein the carcass cords have a divided value $D_{10}$ of the stretch $S_{10}$ at 10% load of breaking load divided by the denier number d of the cord being in a range of $7.35 \times 10^{-4}$ to $14.7 \times 10^{-4}$.

4. A radial tire as recited in claim 1, wherein said sub-groove is disposed in the tread a distance from the tire equator in the range of between 0.215 to 0.31 times the tire sectional width.

5. A radial tire as recited in claim 4, said sub-groove having an inner groove wall and an outer groove wall, wherein the inner groove wall has a height in the range of 0.75 to 0.95 the height of the outer groove wall.

6. A radial tire as recited in claim 1, wherein the breaker cords are disposed in said cut breaker at an angle in the range of between 10 to 45 degrees with respect to the tire equator.

7. A radial tire as recited in claim 6, wherein the carcass cords are disposed in each of said carcass plies at an angle in the range of between 75 to 80 degrees with respect to the tire equator.

8. A radial tire as recited in claim 7, wherein the belt cords are disposed in said belt layer at an angle in the range of between 0 to 5 degrees with respect to the tire equator.

9. A radial tire as recited in claim 1, wherein the breaker cords are disposed in said cut breaker at an angle in the range of between 10 to 30 degrees with respect to the tire equator.

10. A radial tire as recited in claim 1, where the upper and lower planes are equally spaced from the reference plane a distance of $\pm 1/12$ times the diameter of the carcass cords.

11. A radial tire as recited in claim 1, where the upper and lower planes are equally spaced from the reference plane a distance of $\pm 1/14$ times the diameter of the carcass cords.

* * * * *